Aug. 25, 1970    J. C. WIMPENNY    3,525,486
VORTEX GENERATORS

Original Filed Feb. 20, 1967

United States Patent Office 3,525,486
Patented Aug. 25, 1970

3,525,486
VORTEX GENERATORS
John Cecil Wimpenny, Hertfordshire, England, assignor to Hawker Siddeley Aviation Limited, Kingston-upon-Thames, Surrey, England
Continuation of application Ser. No. 617,190, Feb. 20, 1967. This application Apr. 8, 1969, Ser. No. 814,468
Claims priority, application Great Britain, Feb. 22, 1966, 7,788/66
Int. Cl. B64c 21/04, 23/06
U.S. Cl. 244—42
6 Claims

ABSTRACT OF THE DISCLOSURE

A boundary layer control system for an aircraft body having an aerodynamic surface, comprising: a tube of circular cross section having a mouth opening to the exterior of the body at said surface which tube has a portion adjacent said mouth so orientated in relation to said surface that an air stream issuing from the tube through said mouth emerges into the boundary layer over said surface at an acute angle to the surface and travelling in the general direction of the external flow, a vortex generating member situated within said tube near the mouth thereof, and an air trunk within said body communicating with said tube and supplying high pressure air thereto for delivery through said mouth.

DESCRIPTION OF INVENTION

Figure 1:
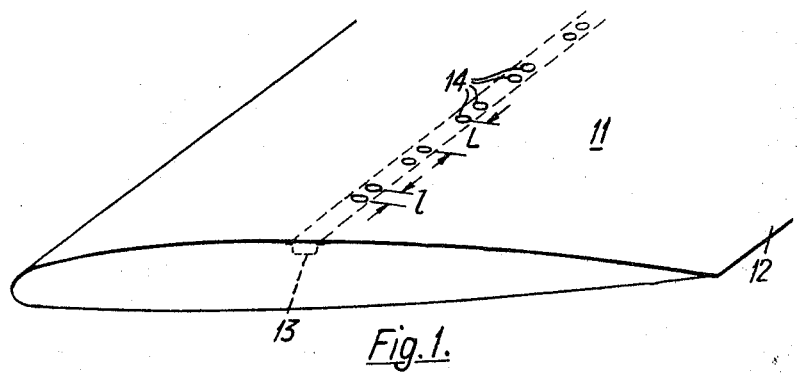

This is a continuation of application Ser. No. 617,190, filed Feb. 20, 1967, and now abandoned.

This invention relates to vortex generators, such as are used on aircraft to improve boundary layer conditions. Vortex generators, as for example described in British Pat. No. 683,865, are a well known and fairly frequently applied device for improving the flow of air, either over a streamlined surface, or in a diverging duct.

Whenever air flows in the vicinity of a surface, there is a gradual change of velocity from the free stream velocity some distance away, to a very much reduced velocity at the surface. Immediately adjacent to the surface, the velocity of flow may actually be zero, or in some cases it may even be reversed. The layer of air flowing at less than full velocity is usually called the boundary layer, and if this is either unduly thick or turbulent, it is likely to have adverse effects on aerodynamic conditions. In the case of flow over the rear part of a streamlined surface or in a diverging duct, there is a general slowing down of the velocity of flow, and there may also be a pressure gradient, both of which contribute towards an undue thickening of the boundary layer, which manifests itself in a general breakaway of the flow from the surface.

In order to improve conditions, it has been found that if air near the surface can be effectively mixed with air flowing some distance away from it, energy from the freely flowing stream can be imparted to the boundary layer, which is thus speeded up and more readily follows the surface. The mixing of air can be achieved by the creation of a multiplicity of small vortices whose axes are roughly parallel to the surface concerned. An efficient means of producing such vortices can be provided by the fitting of small auxiliary surfaces mounted at right angles to the main surface, and placed at some small angle to the direction of flow of the air. The size of these auxiliary surfaces will depend on the thickness of the boundary layer to be corrected. Where these are used on the wing of an aeroplane near the leading edge, or perhaps at some point further aft where there may be a locally thin boundary layer due to the admission of high-energy air from the lower surface through a slot as occurs, for example, on slotted flaps in their downwardly extended position, comparatively small vortex generators are found sufficient. These may extend approximately one to two inches away from the main surface. They thus do not substantially impede the main flow; in some cases they may be mounted on a surface which is exposed only while wing high lift devices are extended, which normally occurs only during landing and take-off.

Recent investigations have shown that, although in the area between leading and trailing edge high lift devices the curvature of the upper wing surface is comparatively small, nonetheless, owing to the length involved, the boundary layer is apt to build up to a considerable thickness. A conventional vortex generator of sufficient size to be beneficial would be too large when considering the drag it would produce. Also, it is not convenient to make such large vortex generators retractable, as generally speaking this part of the wing under consideration is used to provide the main structural member, and it may well be housing fuel. The retraction of large vortex generators would necessitate cutting into the main structure and it would materially reduce the space available for the storage of fuel.

According to the invention, it is proposed to create a vortex flow by ducting a swirling air stream, at a pressure higher than that of the boundary layer to be controlled, through the surface under consideration. This air is to emerge at an acute angle to the surface and proceed either in the general direction of the flow, or at some small angle to it. To cause the air leaving the duct to emerge spirally or with vorticity, there may be at or near the exit of the duct a suitable helical guide or vortex generator placed at an angle to the axis of the duct.

In one practical way of carrying the invention into effect, tubes are installed in a wing at a lateral spacing similar to that which would be chosen if conventional external vortex generators were fitted. These tubes are all connected to a common source of high pressure air, which may be taken from the compressor of one or more of the aircraft engines. Alternatively, it may be more convenient to tap the air from a point elsewhere on the wing or fuselage, where the ambient pressure is sufficiently high compared to the ambient pressure on the upper surface of the wing to create sufficient flow. The tubes pass through the wing surface and are disposed so that their end portions towards the exits extend generally parallel to the direction of the main air flow over the surface, and they intersect the surface at an angle of about ten to thirty degrees. The most advantageous angle can readily be determined experimentally, and may vary beyond the values stated. Towards the mouth of each tube it contains a spiral grid or internal fin or vortex generator so as to ensure helical or vortex flow at the exit, which in turn will induce a somewhat larger swirling flow in the external boundary layer flow.

Figure 2:
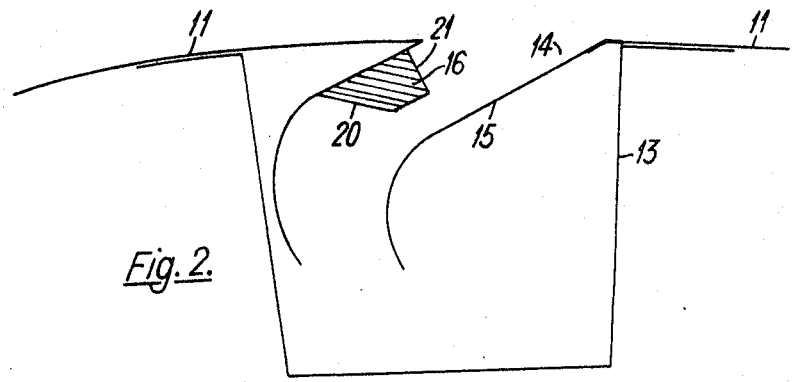
Figure 3:
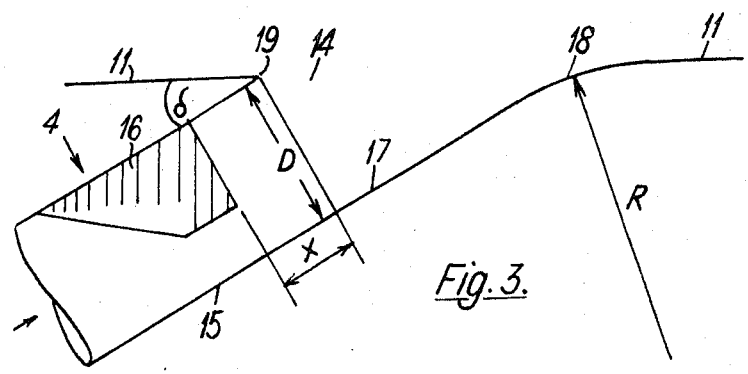
Figure 4:
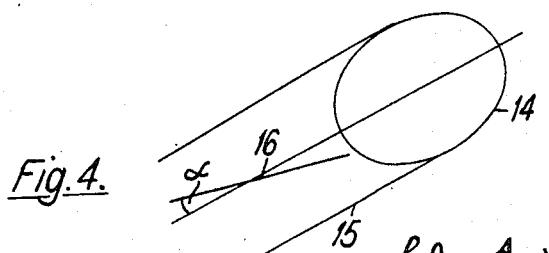
Figure 5:
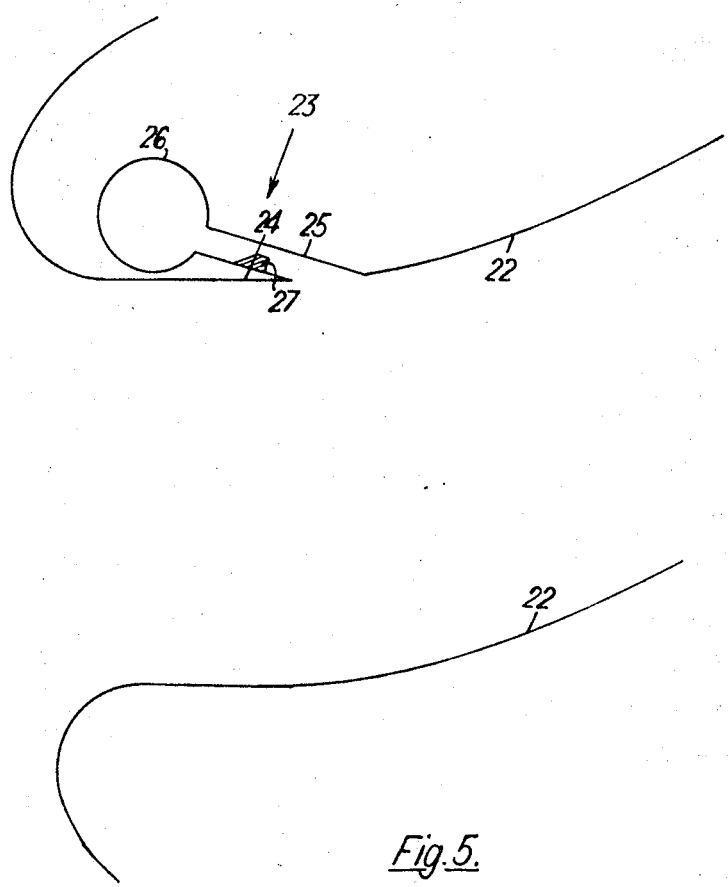

Arrangements in accordance with the invention are illustrated by way of example with reference to the accompanying diagrammatic drawings, in which:

FIG. 1 is a pictorial view of an aircraft wing equipped according to the invention, FIG. 2 is a cross section of a portion of the wing showing an air discharge tube, FIG. 3 shows the air discharge tube in greater detail, FIG. 4 is a diagram of a vortex generator in the tube, seen in the direction of the arrow 4 of FIG. 3, and FIG. 5 illustrates the invention applied to an air intake.

Referring firstly to FIG. 1, there is shown a wing 12 in which there is provided just below the upper skin 11 a trunk 13 extending span wise of the wing. This trunk supplies air under pressure to a row of separate individual spaced tubes of which the mouths 14 can be seen opening through the wing skin 11 so as to deliver air into the boundary layer associated with the upper surface of the wing. The tubes are arranged in pairs, the spacing of the two tubes in any pair being designated l while the spacing between one tube of one pair and the nearest tube of the next pair is designated L. As can clearly be seen in FIG. 1, the spacing L is quite large in comparison with the tube diameter, so that the sum of the diameters of all the tubes in the row is only a minor proportion of the spanwise dimension of the wing 12 measured from end to end of the tow of tubes. This leads to a great reduction in air requirement as compared to previous arrangements in which boundary layer control slots, and not tubes, have been employed.

FIG. 2 shows the arrangement of the air discharge tube 15 in more detail, the tube curving round so as to slant rearward and meet the wing skin 11 at an angle of roughly 20°. Within the tube 15 secured to the forward upper wall portion thereof and near to the mouth 14 there is situated a fin or vortex generator 16. This is in a plane nearly at right angles to the wing surface, and nearly parallel to the axis of the tube 15, but it is set at a small angle to the air flow in the tube so as to create a swirl or vortex in the air stream issuing from the tube mouth which in turn induces a somewhat more extensive swirl or vortex in the boundary layer associated with the wing surface 11. The vortex generator has a sloping leading edge 20 and a steep trailing edge 21.

FIG. 3 illustrates a number of variable parameters associated with the tube and vortex generator. The diameter of the tube 15 is designated D and the tube mouth is disposed at an angle $\delta$ with respect to the wing surface 11. The tube wall 17 merges into the wing surface 11 immediately aft of the tube mouth 14 at a region 18 where the surface is given a radius of curvature R. The opposite side of the tube wall meets the wing surface immediately forward of the tube mouth in a sharp edge 19 and the vortex generator or fin 16 is set back within the tube by a distance X from this edge. FIG. 4 illustrates a further parameter, i.e. the angle $\alpha$, at which the vortex generator 16 is set with respect to the air flow in the tube. All the aforementioned parameters $l$, L, D, $\delta$, R, X and $\alpha$ may be varied as desired to give the optimum result in any particular case. It is also possible to vary the cross section of the tube, the peripheral position of the vortex generator around the tube wall, and the angle between the tube axis and the vertical fore and aft plane of the aircraft. Furthermore, the vortex generators in different tubes may be set in opposite directions to swirl the air in opposite senses, if desired.

The invention is also applicable to the control of boundary layers which are not of excessive thickness but where a greater measure of control is required than that usually obtained from conventional mechanical vortex generators. A well known method of control is to blow air through thin slits in the surface in order to re-energize the boundary layer. The main disadvantage of this method is that it is apt to be uneconomical in the use of air and it has also been found difficult to construct suitable slits which must be of considerable length with very narrow openings. By using vortex generators according to the invention, energy from the free air stream outside the boundary layer is imparted to the boundary layer by virtue of the vortex or swirl mixing effect. Thus, in a given situation individual blown vortex generators will require less air than a conventional slit.

Further advantageous applications of blown vortex generators according to the invention are engine air intakes, portions of flight control surfaces where blowing is to be employed to effect control at low forward speeds and high deflection and in aerodynamic interference situations such as at a tail-fin junction. Another application is in the control of shock-induced boundary layer separations. Particularly in the case of an engine intake, control is often required only at low forward speeds where the angle of incidence may be high. Mechanical vortex generators are known to have solved problems arising in such a way, but they are liable to cause loss of intake efficiency.

FIG. 5 illustrates the mouth of an engine air intake 22 with a blown vortex generator 23 discharging rearwardly at one surface 24 within the intake. As before, the blown vortex generator 23 comprises a tube 25 receiving its air under pressure from a supply trunk 26 buried in the intake lip, with a vortex generating fin 27 situated in the tube near the mouth thereof.

I claim:

1. A boundary layer control system for an aircraft body having an aerodynamic surface, comprising a plurality of separate individual spaced tubes disposed in a row within said aircraft body which row is transverse to the general direction of the external air flow over said aerodynamic surface, the spacing of the tubes being selected such that the sum of the diameters of all the tubes in the row is only a minor proportion of the dimension of said aircraft body measured from end to end of said row, each said tube having a mouth opening to the exterior of the body through said surface, and said tube further having a portion adjacent said mouth so orientated in relation to said surface that an air stream issuing from the tube through said mouth emerges into the boundary layer over said surface at an acute angle to the surface and travelling in the general direction of the external flow, a respective vortex generating member situated within each said individual tube near the mouth thereof whereby the air stream issuing from the tube through said mouth thereof possesses vorticity, and an air trunk within said body communicating with said tubes and supplying high pressure air thereto for delivery through said mouths.

2. A system according to claim 1, wherein the portion of the wall of each said tube joining the portion of said surface immediately aft of the respective tube mouth merges into it by means of a surface region having a predetermined radius of curvature.

3. A system according to claim 1, wherein the portion of the wall of each said tube joining the portion of said surface immediately forward of the respective tube mouth meets it in a sharp edge.

4. A system according to claim 1, applied to the upper surface of an aircraft wing and wherein said row of tubes are disposed spanwise along the wing.

5. A system according to claim 4, wherein each tube is set at an angle to the vertical fore and aft plane of the aircraft.

6. A system according to claim 4, wherein the vortex generating blades in different tubes are set in opposite directions to swirl the air stream in opposite senses.

References Cited

UNITED STATES PATENTS 2,041,793   5/1936   Stalher _____ 244—40
2,694,357   11/1954  Lee.

TRYGVE M. BLIX, Primary Examiner

J. L. FORMAN, Assistant Examiner

U.S. Cl. X.R.

244—40, 41, 130